United States Patent
Lee et al.

(10) Patent No.: US 7,560,054 B2
(45) Date of Patent: Jul. 14, 2009

(54) CARBOXYLIC ESTER DISPERSANT AND SULFIDE PHOSPHOR PASTE COMPOSITION HAVING SAME

(75) Inventors: Eun Sung Lee, Seoul (KR); Jae Young Choi, Suwon-si (KR); Seon Mi Yoon, Yongin-Si (KR); Xiaoqing Zeng, Suwon-Si (KR); Don-Ik Lee, Icheon-Si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 517 days.

(21) Appl. No.: 11/407,597

(22) Filed: Apr. 20, 2006

(65) Prior Publication Data
US 2007/0072969 A1 Mar. 29, 2007

(30) Foreign Application Priority Data
Sep. 27, 2005 (KR) .................. 10-2005-0089970

(51) Int. Cl.
H01B 1/10 (2006.01)
C09K 11/02 (2006.01)
C09K 11/54 (2006.01)
C09K 11/56 (2006.01)

(52) U.S. Cl. ............. 252/519.5; 252/520.1; 252/520.2; 252/520.5; 252/521.1; 252/518.1; 252/301.36; 252/301.4 R; 252/301.6 S; 252/301.4 S; 252/301.4 P; 252/301.4 H; 252/301.6 P

(58) Field of Classification Search ............. 252/519.5, 252/520.1, 520.2, 520.5, 521.1, 518.1, 301.36, 252/301.4 R, 301.6 S, 301.4 S, 301.4 P, 301.4 H, 252/301.6 P
See application file for complete search history.

(56) References Cited

U.S. PATENT DOCUMENTS

| | | | | |
|---|---|---|---|---|
| 3,758,409 A | * | 9/1973 | Nakagawa et al. | 510/370 |
| 4,071,468 A | * | 1/1978 | Abel et al. | 516/123 |
| 4,092,266 A | * | 5/1978 | Abel et al. | 516/123 |
| 4,405,413 A | * | 9/1983 | Skimin | 205/314 |
| 4,607,121 A | * | 8/1986 | Faggian et al. | 562/537 |
| 5,952,036 A | * | 9/1999 | Tadaki et al. | 427/64 |
| 6,439,943 B1 | * | 8/2002 | Aoki et al. | 445/24 |
| 6,773,628 B2 | * | 8/2004 | Kinno | 252/301.36 |
| 6,794,821 B2 | * | 9/2004 | Juestel et al. | 313/587 |
| 7,170,222 B2 | * | 1/2007 | Choi et al. | 313/486 |
| 7,358,668 B2 | * | 4/2008 | Kwon | 313/582 |
| 7,429,340 B2 | * | 9/2008 | Kwon | 252/301.36 |
| 7,473,514 B2 | * | 1/2009 | Lee et al. | 430/286.1 |
| 2003/0151032 A1 | * | 8/2003 | Ito et al. | 252/570 |
| 2004/0099847 A1 | * | 5/2004 | Miura | 252/500 |
| 2006/0076879 A1 | * | 4/2006 | Kwon | 313/485 |
| 2007/0102676 A1 | * | 5/2007 | Lee et al. | 252/500 |
| 2007/0157852 A1 | * | 7/2007 | Lee et al. | 106/278 |

OTHER PUBLICATIONS

Reg. No. 38142-12-0, Nov. 16, 1984.*
Reg. No. 87973-11-3, Nov. 16, 1984.*
Reg. No. 121057-09-8, Jun. 9, 1989.*

* cited by examiner

Primary Examiner—Douglas MC Ginty
(74) Attorney, Agent, or Firm—Cantor Colburn LLP

(57) ABSTRACT

Disclosed herein is a carboxylic ester dispersant shown in the following Formula 1 and a sulfide phosphor paste composition containing the dispersant. The dispersant improves the dispersibility of the sulfide phosphor paste composition and prevents oxidation by a solvent, thus improving processability and the luminescent properties of a phosphor film made from the paste and of a display produced using the film.

Formula 1

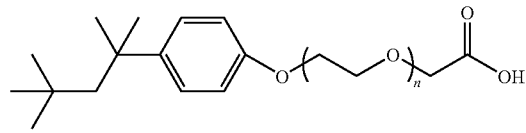

In Formula 1, n is 1-20.

11 Claims, 6 Drawing Sheets

CARBOXYLIC ESTER DISPERSANT AND SULFIDE PHOSPHOR PASTE COMPOSITION HAVING SAME

BACKGROUND OF THE INVENTION

This application claims the priority of Korean Patent Application No. 10-2005-0089970, filed on Sep. 27, 2005 in the Korean Intellectual Property Office, the disclosure of which is incorporated herein in its entirety by reference.

1. Field of the Invention

The present invention relates to a carboxylic ester dispersant and a sulfide phosphor paste composition comprising the same. More particularly, the present invention pertains to a carboxylic ester dispersant which has a tail structure including hydrophilic and hydrophobic blocks to prevent oxidation by a solvent and to improve dispersibility, and a sulfide phosphor paste composition comprising the same.

2. Description of the Related Art

Recently, a liquid crystal display, a plasma display panel, an electroluminescent display, a field emission display, and a vacuum fluorescent display have been developed and extensively used as a flat panel display (FPD) to replace the conventional cathode ray tube (CRT). These displays all have a phosphor film, and luminescent properties of the displays depend on physical properties of the phosphor film.

A sulfide phosphor, such as $SrGa_2S_4$, is extensively used in the field emission display and cathodoluminescence display fields. A phosphor paste composition is uniformly applied on a predetermined supporter and then dried to produce a phosphor used as a phosphor film of a display. A sulfide phosphor paste composition consists mostly of a mixture of a solvent, a binder, and a sulfide phosphor, and may further include a dispersant to improve the dispersibility of the phosphor.

The sulfide phosphor paste tends to react with moisture or be chemically unstable in an organic solvent, such as ethyl cellulose, terpineol, and butyl carbitol acetate (BCA), used to produce the phosphor paste. Some components of the sulfide phosphor paste composition may be completely dissolved in the solvent, such as ethyl cellulose. In this case, when it is used as the phosphor film for a display, the luminescent properties of the display may deteriorate.

Furthermore, if the viscosity reduction effect owing to the dispersant is insufficient in the sulfide phosphor, the use of a relatively small amount of phosphor is necessary to avoid undesirable increases in viscosity. On the other hand, an increase in the loading amount of the phosphor will cause an increase in viscosity, thereby making uniform formation of the phosphor film difficult. Thus, insufficient viscosity reduction has a detrimental impact on processability and/or productivity.

SUMMARY OF THE INVENTION

Accordingly, the present invention has been made keeping in mind the above problems occurring in the prior art, and an object of the present invention is to provide a carboxylic ester dispersant which improves the dispersibility of a sulfide phosphor paste composition and prevents oxidation by an organic solvent.

Another object of the present invention is to provide a sulfide phosphor paste composition which has excellent dispersibility and uniform physical properties.

Still another object of the present invention is to provide a phosphor film which has excellent processability and high brightness, and a display including the same.

In order to accomplish the above objects, an aspect of the present invention provides a carboxylic ester dispersant shown in the following Formula 1.

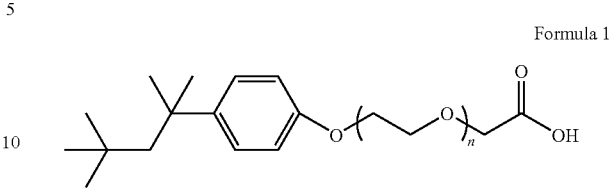

Formula 1

In Formula 1, n is 1-20.

Another aspect of the present invention provides a sulfide phosphor paste composition which comprises a binder solution including a solvent and an organic binder, a phosphor, and a carboxylic ester dispersant of Formula 1.

The sulfide phosphor paste composition of the present invention may comprise about 40 to about 70 weight percent (wt %) phosphor and about 0.1 to about 3 wt % dispersant based on the weight of phosphor.

Yet another aspect of the present invention provides a phosphor film produced using the sulfide phosphor paste composition of the present invention.

A further aspect of the present invention provides various displays, such as a cathodoluminescent display, a liquid crystal display, and an electroluminescent display, which comprise the phosphor film of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a detailed description will be given of the present invention, referring to the accompanying drawings.

The dispersant of the present invention is a carboxylic ester dispersant having a tail structure including hydrophilic and hydrophobic groups, as shown in the following Formula 1.

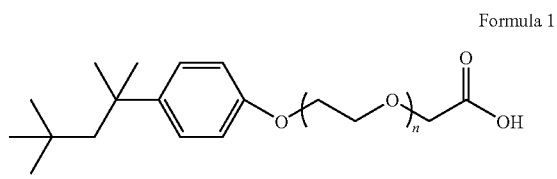

Formula 1

In Formula 1, n is 1-20.

The carboxylic ester dispersant of the present invention can improve the dispersibility of a sulfide phosphor paste and allow an increase in the loading amount of a phosphor in a phosphor paste composition with reduced effect on the viscosity of the paste composition. Accordingly, a phosphor film or a display produced using the phosphor paste composition of the present invention has improved brightness.

Figure 1A:
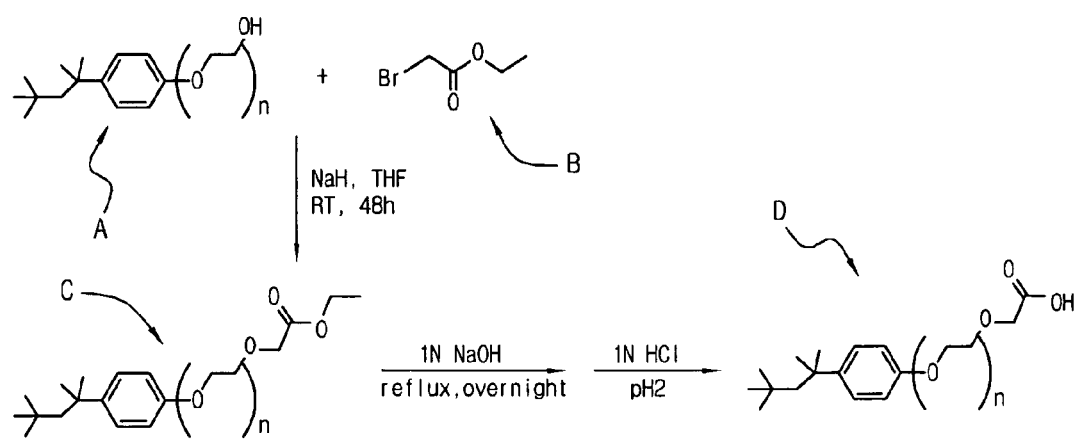
FIG. 1A illustrates one embodiment of a chemical reaction for the synthesis of a dispersant as described herein.

The novel carboxylic ester dispersant of the present invention may be synthesized according to the scheme of the following Reaction Equation 1 of FIG. 1A.

In the process of reaction equation 1 (FIG. 1A), NaH is dissolved in THF at room temperature, and a compound A is added to the solution under an inert atmosphere. The resulting mixture is then agitated for about 4 hours and compound B (ethyl α-bromoacetate) is then added. The reaction is allowed to proceed at room temperature for 48 hours. The solvent is then removed and the reactants are poured into n-hexane or another suitable solvent, and the remaining solids are filtered. The filtrate is then removed under reduced pressure. The obtained compound C may then optionally be purified, for example, by using column chromatography. Next, the compound C is refluxed overnight using a NaOH aqueous solution. The resulting aqueous solution is adjusted to about pH 2 and is then extracted with $CHCl_3$ or another suitable solvent. The organic solvent is then removed under reduced pressure. A column chromatography process may be conducted to produce the carboxylic ester dispersant (compound D) of Formula 2.

The carboxylic ester dispersant of the present invention may be incorporated into a sulfide phosphor paste composition, or any other dispersed solution in which inorganic nanoparticles are dispersed in an organic solvent.

The phosphor paste composition of the present invention comprises a solvent, a binder, and a phosphor, and these components may be the same as or similar to those of a typical phosphor paste composition.

The binder solution comprises an organic binder and a solvent. The organic binder is dissolved in the solvent to provide viscosity and also adhesion strength after the phosphor paste composition is dried. Illustrative, but non-limiting, examples of an organic binder suitable for use in the present invention include one or more of acryls, styrenes, celluloses, a methacrylic acid ester polymer, a styrene-acrylic ester copolymer, polyvinyl butyral, polyvinyl alcohol, polyethylene oxide, polypropylene carbonate, and polymethylmethacrylate. For example, if screen printing is conducted, it is preferable to use a cellulose-based polymer, such as ethyl cellulose.

As to the solvent constituting the binder solution, commercial solvents may be used alone or in a mixed solvent form in consideration of physical properties of the phosphor, the organic binder, and the desired phosphor paste composition. The solvent usable in the phosphor paste composition of the present invention is not limited, but it is preferable to use a solvent having an evaporation temperature of 150° C. or higher.

Solvents suitable for use in the present invention are exemplified by an aromatic hydrocarbon compound, such as toluene and xylene, an ether compound, such as tetrahydrofuran and 1,2-butoxy ethane, a ketone compound, such as acetone and methyl ethyl ketone, an ester compound, such as ethyl acetate, butyl acetate, and butyl carbitol acetate (BCA), and an alcohol compound, such as isopropyl alcohol, diethylene glycol monobutyl ether, terpineol, and 2-phenoxyethanol. An example of the preferred mixed solvent is a mixture of terpineol and butyl carbitol acetate. The mixed solvent includes terpineol and butyl carbitol acetate in a weight ratio of about 1:1 to about 1:2.5, and preferably 1:1.7.

The binder solution contains about 1.5 to about 5 wt % organic binder, optionally, about 2 to about 4 wt %, based on the weight of organic binder plus solvent. If the binder solution contains less than about 1.5 wt % organic binder there is the undesirable possibility of reduction of the quality of the resulting phosphor film. On the other hand, if the amount of organic binder is more than about 5 wt %, there may be an undesirable increase in the viscosity of the phosphor paste, and the undesirable possibility of reduction of the phosphor content in the paste in order to attain a suitable viscosity.

All of the phosphors used in a typical phosphor paste composition may be used as the phosphor in the phosphor paste composition of the present invention. The type or composition of the phosphor is not particularly limited. However, the phosphor paste composition of the present invention is mainly used to form a phosphor film of a cathodoluminescent display, a liquid crystal display, or a field emission display, and consequently, the composition may be selected depending on the excitement source of the display which excites a phosphor film formed using it.

In practice, the phosphor may be exemplified by a red phosphor, a green phosphor, and a blue phosphor which are normally used in displays and commercialized in an oxide solid solution form. Preferably, a solid solution type of phosphor including barium oxides, magnesium oxides, and aluminum oxides mixed with each other may be used. In one particular embodiment, the dispersant of the present invention is added to the sulfide phosphor paste composition comprising $SrGa_2S_4$. Other illustrative, but non-limiting, examples of the sulfide phosphor suitable for use in the present invention include $SrS:Eu^{2+}$, $SrGaS:Eu^{2+}$, $SrCaS:Eu^{2+}$, $ZnS:Ag^+$, $CaS:Eu^{2+}$, $ZnS:Cu^+Al^{3+}ZnS:Ag^+$, $Cl^-$, $La_2O_2S:Eu^{3+}$, $Y_2O_2S:Eu^{3+}$, $CaAl_2S_4$, and $BaAl_2S_4:Eu^{2+}$.

Optionally, the phosphor paste composition may further include any one or more additives such as a plasticizer, a leveling agent, a lubricating agent, an antifoaming agent and the like.

The phosphor paste composition of the present invention may comprise about 40 to about 70 wt % phosphor, and about 0.1 to about 3 wt % carboxylic ester dispersant based on the weight of the the phosphor. One optional embodiment comprises about 50 to about 60 wt % phosphor and about 1 to about 2 wt % dispersant based on the weight of the phosphor. In the present invention, if the loading amount of the dispersant is less than about 0.1 wt %, the maintenance of desired viscosity with high loadings of phosphor is insufficiently assured. On the other hand, if the amount of dispersant is more than about 3 wt %, the content of the other components is reduced, thus there is the undesirable possibility of deterioration of the physical properties of the phosphor paste.

In the present invention, the above-mentioned carboxylic ester dispersant is used to increase the content of the phosphor, which may be about 40 to about 70 wt % of the phosphors paste, and an increase in amount of the phosphor used in the phosphor paste increases the brightness of the phosphor film formed using the paste.

The phosphor paste composition of the present invention may be produced by adding the phosphor powder after the dispersant is added to the binder solution. For example, the organic binder, such as ethyl cellulose, may be dissolved in a mixed solvent that includes butyl carbitol acetate and α-terpineol. The dispersant and any desired optional additives such as the antifoaming agent and/or the lubricating agent, are added thereto. The phosphor is added, and all phosphor paste components are uniformly dispersed using a kneader, such as a 3-pattern roller, to produce the composition.

Another aspect of the present invention pertains to a phosphor film produced using the phosphor paste composition described herein. The phosphor paste composition may be applied on a supporter, such as a glass and/or a transparent plastic substrate, in a predetermined pattern. The applied phosphor paste composition is then dried, baked, and sintered to produce the phosphor film of the present invention. Illustrative, but non-limiting, examples of a method for forming the phosphor film include a pattern screen printing method, an electrophoresis method, a photolithography method, and an ink-jet method.

The dispersant of the present invention enables the use of high loadings of phosphors in the paste with limited increase of viscosity, so that the brightness of the phosphor film produced therefrom is improved and processability is improved.

The phosphor film according to the present invention may be used as a phosphor film of a display such as a cathodoluminescent display, a liquid crystal display, an electroluminescent display, a field emission display, or a vacuum fluorescent display. The display including the phosphor film of the present invention has improved luminescent properties and uniform physical properties.

A better understanding of the present invention may be obtained through the following examples which are set forth to illustrate, but are not to be construed to limit the present invention.

SYNTHESIS EXAMPLE OF A CARBOXYLIC ESTER DISPERSANT

Figure 1B:
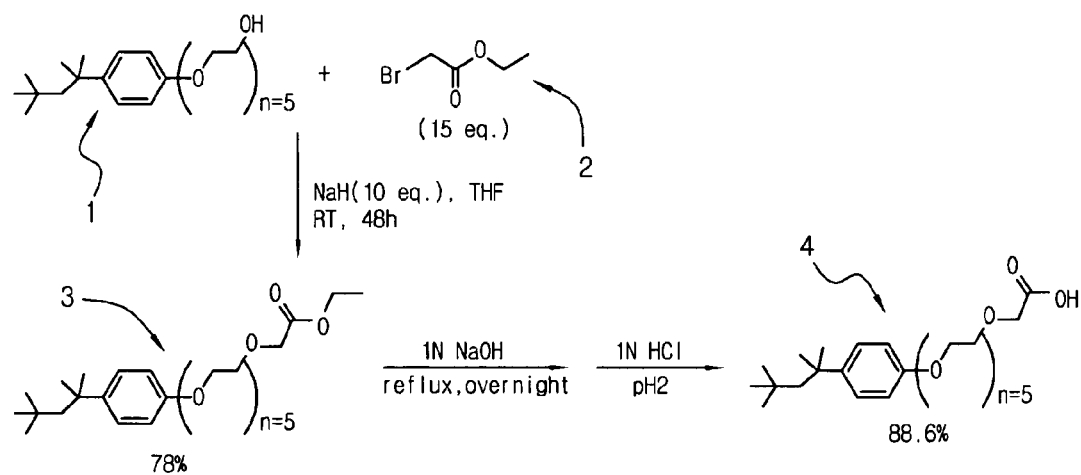
FIG. 1B illustrates one specific embodiment of a reaction for the synthesis of a dispersant.

The carboxylic ester dispersant of the following Formula 2 was synthesized according to the reaction scheme shown in the following Reaction Equation 2 of FIG. 1B.

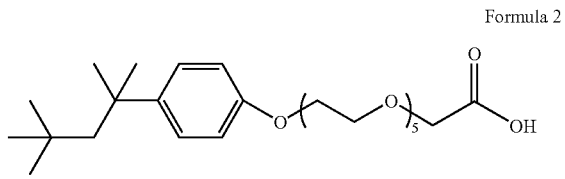

Formula 2

As represented in Reaction Equation 2, after NaH (305 mmol, 7.32 g) was put into a three neck flask and then mixed with THF (500 ml) at room temperature, a compound 1 (30.5 mmol, 13 g) was added thereto under an argon gas atmosphere. The resulting mixture was agitated for about 4 hours, and compound 2 (457.7 mmol, 76.4 g) was then added, and the reaction was conducted at room temperature for 48 hours. After the solvent was removed, the reactants were poured into n-hexane, the remaining solids were filtered using cellite (a porous ceramic filter useful for filtering amphiphillic oligomers, obtained from Merck Corporation), and the filtrate was removed under reduced pressure. The obtained compound 3 was purified using column chromatography (MC:MeOH=20:1) to produce a red oil intermediate (yield 78%)

Figure 1C:
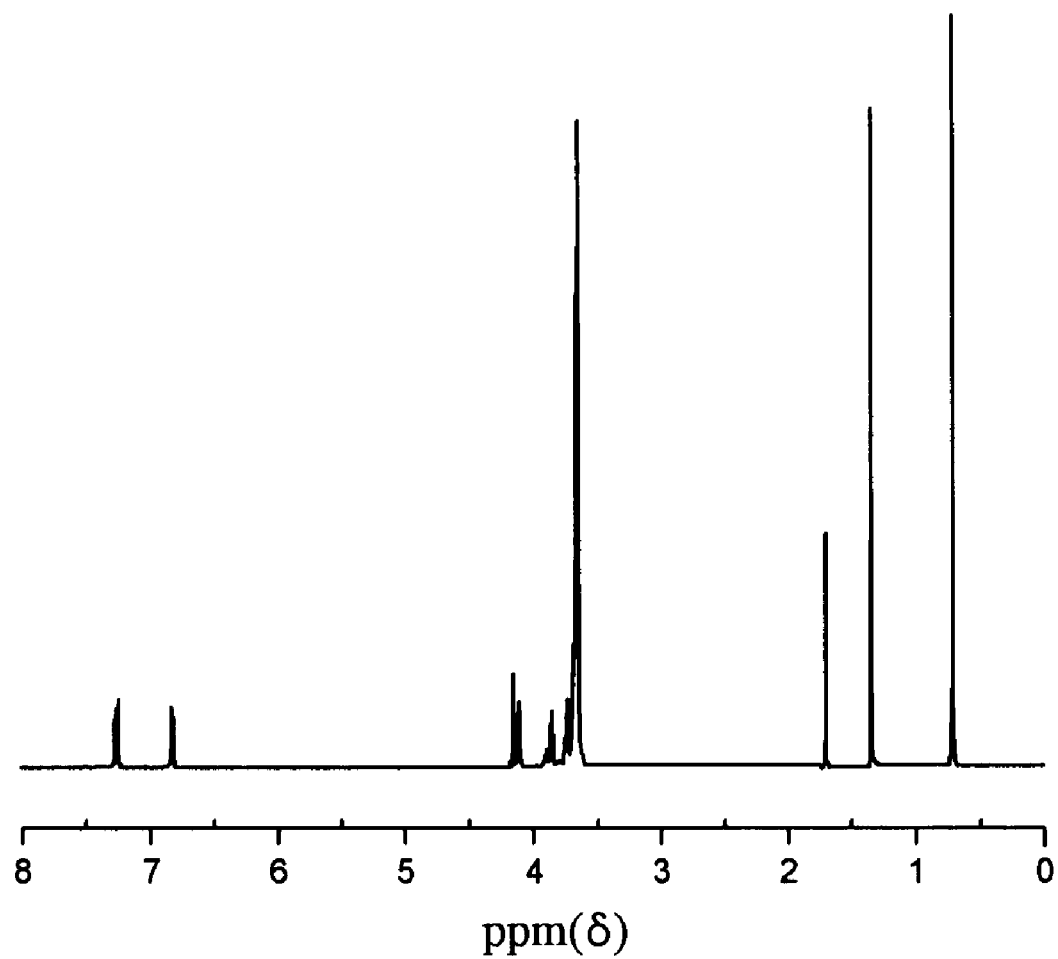
FIG. 1C illustrates a $^1$H-NMR spectrum of a novel carboxylic ester dispersant of the present invention.

Next, the resulting compound 3 (23.9 mmol, 12.7 g) was refluxed overnight using a NaOH aqueous solution (200 ml). The pH of the resulting aqueous solution was adjusted to pH 2 using 1N HCl and the solution was then extracted with $CHCl_3$ twice (200 ml×2). The organic layer was dried with $MgSO_4$ and the organic solvent was removed under reduced pressure. A column chromatography process (MC:MeOH=20:1) was conducted to produce the carboxylic ester dispersant (compound 4) of Formula 2, which was present in a yellow oil form (yield 88.6%). The 500 MHz $^1$H-NMR spectrum of the resulting dispersant is shown in FIG. 1C.

EXAMPLE 1

Commercial $SrGa_2S_4$ powder (KX501A obtained from Kasei Optonix Ltd. Japan) was used as a phosphor. The phosphor powder was vacuum dried at 130° C. for 24 hours before use. A mixed solvent comprising a mixture of 4.61 g of alpha-terpineol and 7.68 g of butyl carbitol acetate was prepared. A binder solution, in which 0.51 g of ethyl cellulose was dissolved in the mixed solvent, was prepared using the mixed solvent. The phosphor powder was added to the resulting binder solution, the carboxylic ester dispersant of Formula 2 was added thereto, and milling was conducted to produce the phosphor paste composition of the present invention.

Comparative Example 1

The procedure of example 1 was repeated to produce a phosphor paste composition, except that the dispersant was not used.

Comparative Examples 2 to 4

The procedure of example 1 was repeated to produce phosphor paste compositions of comparative examples 2 through 4 except that instead of the dispersant of Formula 2, an oleic acid (obtained from Sigma-aldrich, USA) shown in the following Formula 3 was used as a dispersant for comparative example 2; oleoyl sarcosine (obtained from NOF Corporation, Japan) shown in the following Formula 4 was used as a dispersant for comparative example 3; and a commercially available phosphoric acid dispersant (BYK111, manufactured by BYK-Chemie Corp. in Germany) shown in the following Formula 5 was used as a dispersant for comparative example 4.

Formula 3

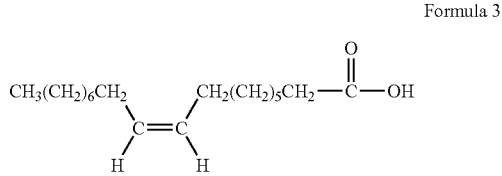

-continued

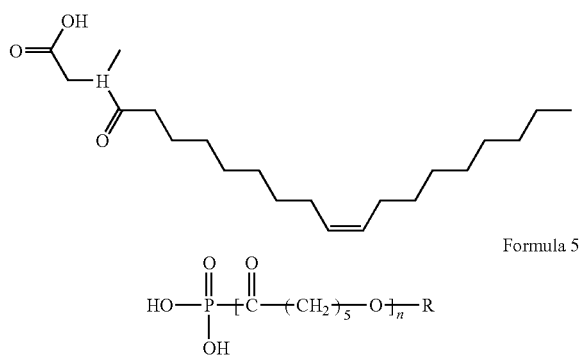

Formula 4

Formula 5

In Formula 5, R is an oxyethylene methacryloyl group and n is 5.

Experimental Example 1

Evaluation of Viscosity Change of the Phosphor Paste Composition

Figure 2:
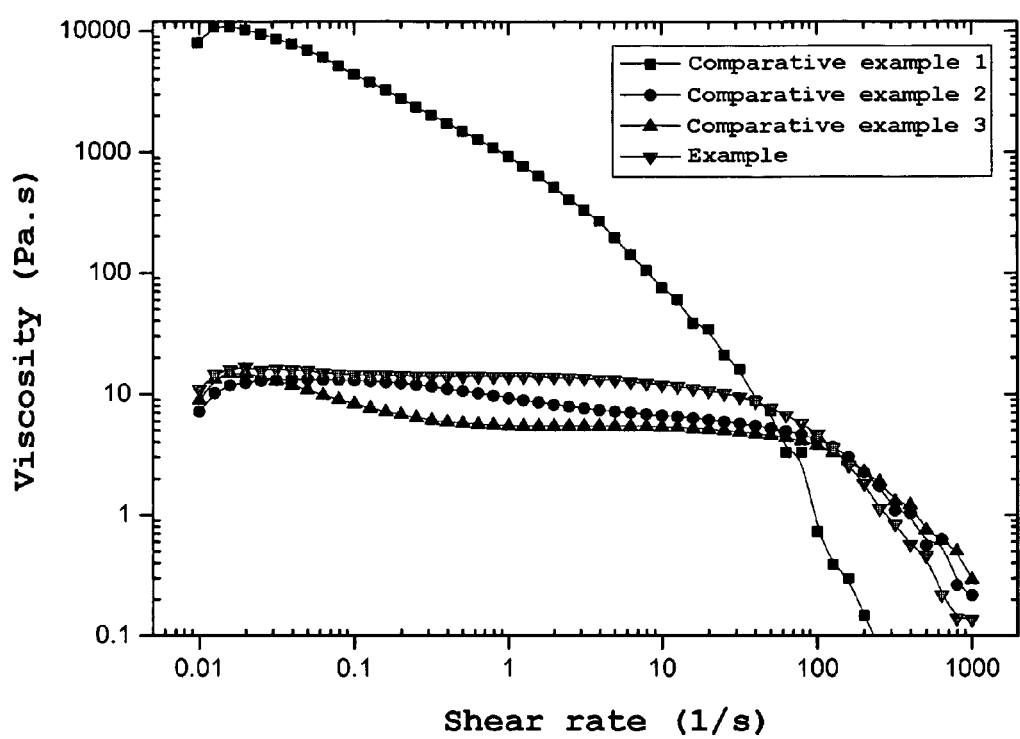
FIG. 2 is a graph showing viscosity as a function of shear rate for phosphor paste compositions of an example and comparative examples.

A phosphor ($SrGa_2S_4$ powder) was added to a binder solution (including the dispersant) which was the same as that of example 1 to prepare a phosphor paste composition. The change in viscosity was measured while the shear rate was increased, and the results are shown in FIG. 2. In connection with this, the viscosity was measured using a viscometer (AR2000, Thermal Analysis Corp., USA), and the change in viscosity depending on the shear rate was measured using a No. 14 spindle under measurement conditions in which the temperature was 24.5-25.5° C. and the measurement time was 30 sec. The phosphor pastes of Comparative Examples 1 to 3 were produced for a comparison, changes in their viscosities depending on the shear rate were measured, and the results are shown in FIG. 2. Moreover, the phosphor pastes of Example and Comparative Examples 1 and 4 were produced, changes in their viscosities were measured depending on the shear rate, and the results are shown in FIG. 3.

Figure 3:
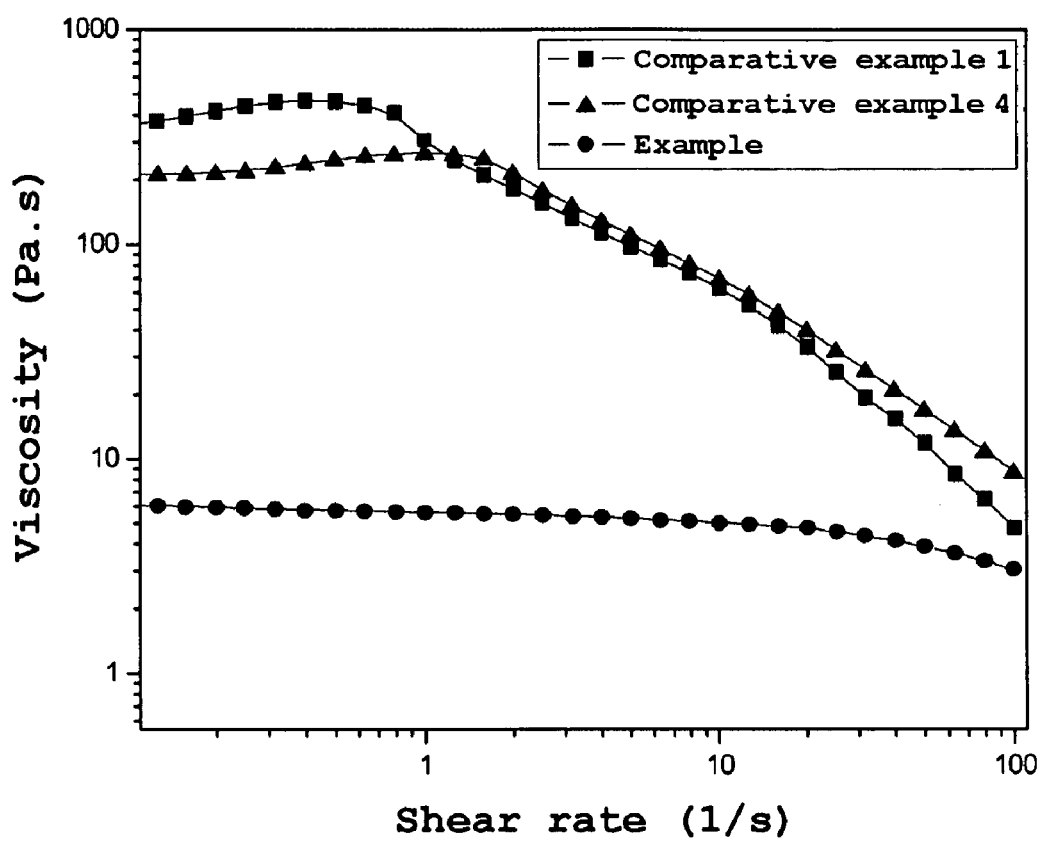
FIG. 3 is a graph showing viscosity as a function of a shear rate for phosphor paste compositions of the example and another comparative example.

With reference to FIGS. 2 and 3, in the case of Example 1, in which the carboxylic ester dispersant according to the present invention was used, the reduction of viscosity was significant in comparison with the phosphor paste compositions of Comparative Examples 1 and 4. When the shear rate was increased, the reduction of viscosity was still more significant in comparison with Comparative Examples 2 and 3.

The above-mentioned results mean that, in the case of the phosphor paste composition including the dispersant of the present invention, it is possible to improve the luminescent properties of the phosphor film by increasing the loading amount of phosphor.

Experimental Example 2

Evaluation of Viscoelastic Properties of the Phosphor Paste Composition

Figure 4:
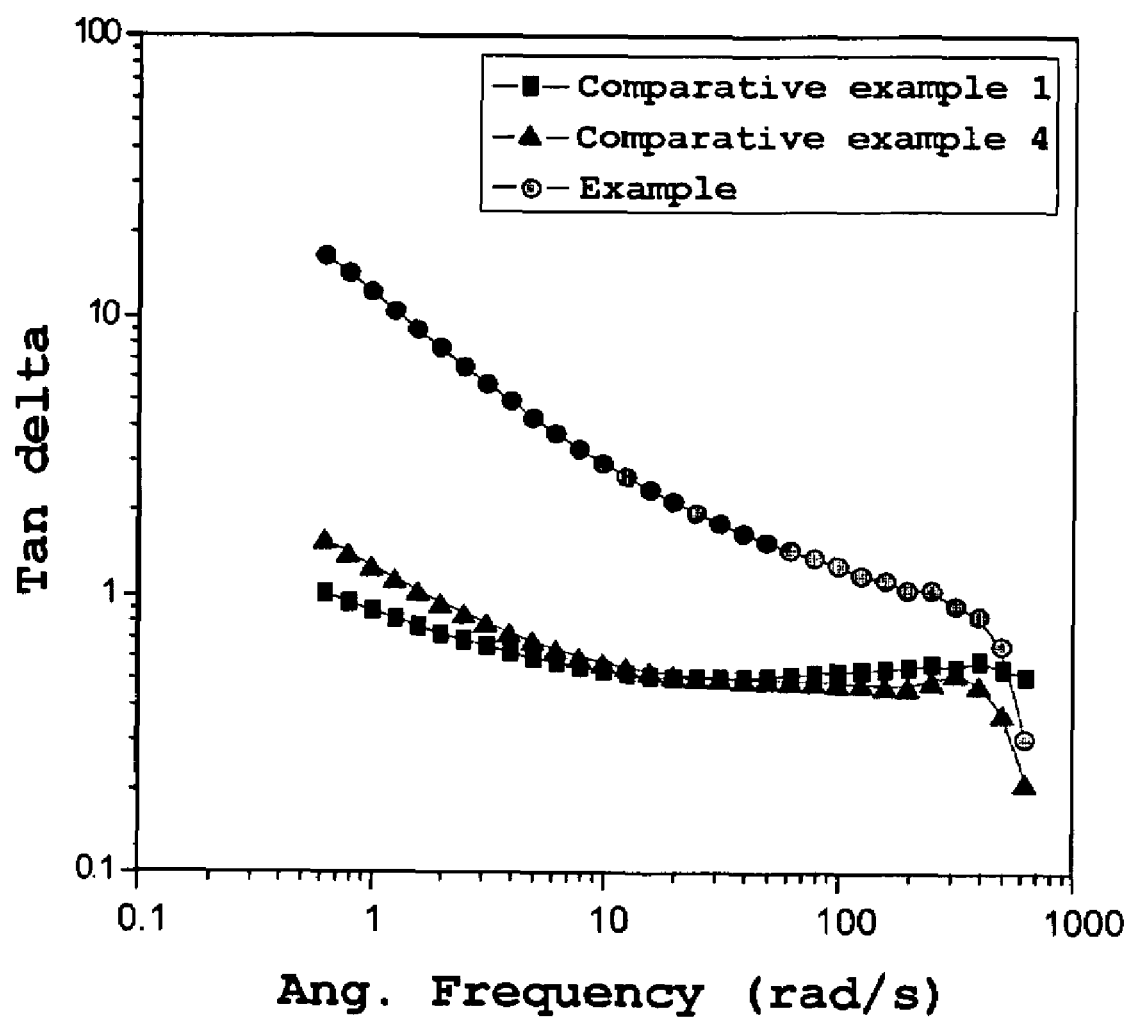
FIG. 4 is a graph showing viscoelastic properties of the phosphor paste compositions of the example and the comparative examples.

The relationship of tangent delta values (δ) to angle frequencies (rad/s) of phosphor pastes of example 1 and Comparative Examples 1 and 4 are shown in FIG. 4. Tangent delta (δ) is G"/G', viscous coefficient/elastic coefficent. The tangent delta (δ) of the phosphor paste composition of Example 1 was still higher than that of the phosphor paste composition of Comparative Example 1. A kinetically movable space was large in a nicely dispersed suspension but small in a suspension in an agglomerated state. When the dispersant of the present invention was added, more kinetically movable spaces were formed in comparison with those of Comparative Examples. Thus it can be seen that the dispersibility of the phosphor in the phosphor paste composition was improved.

Experimental Example 3

Evaluation of Luminescent Properties of the Phosphor Paste Composition

The phosphor pastes produced in Example 1 and Comparative Examples 1 and 2 were applied to a thickness of 30 μm on a glass supporter using a film applicator (produced by BYK-Gardner). The coated layer was sintered at 480° C. using a lamp at a heating rate of 5° C./min to form the phosphor film, and the luminescent properties of the phosphor film were tested.

Figure 5:
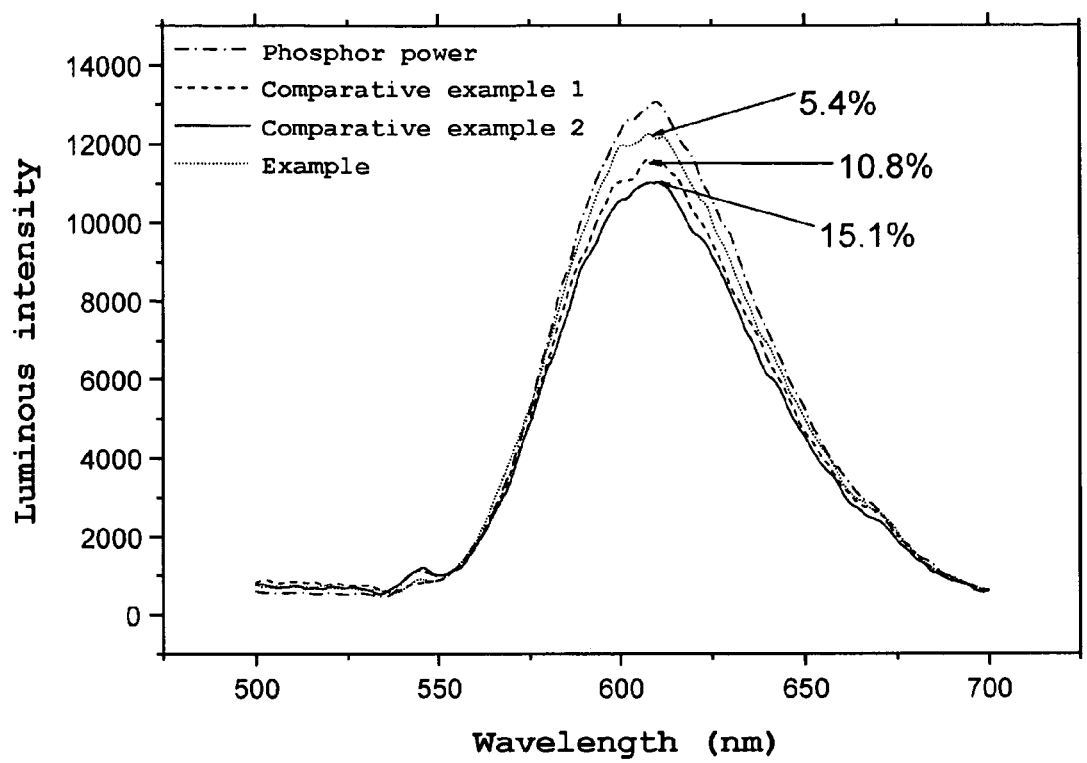
FIG. 5 is a graph showing luminescent properties of a phosphor film produced using the phosphor paste compositions of the example and the comparative examples.

The test for the luminescent properties was conducted using a phosphor emission and decay measurement system (PEDS, which comprises a VUV excimer lamp manufactured by USHIO Inc. in Japan and a vacuum chamber system manufactured by Motech vacuum Inc. in Korea). The measurement was conducted under test conditions in which the vacuum atmosphere was 10 to 3 Torr, the light source had a wavelength of 146 nm, the measurement wavelength range was 230 to 780 nm, and the wavelength interval was 1 nm. The results are shown in FIG. 5. For comparison, the luminescent properties of the phosphor powder used in Example 1 were measured, and are also shown therein.

As shown in FIG. 5, if the carboxylic ester dispersant of the present invention was used, luminous intensity was reduced by about 5.4% in comparison with the maximum luminous intensity of the phosphor powder. On the other hand, in the cases of Comparative Example 1, in which the dispersant was not used, and Comparative Example 2, in which a conventional oleoyl acid was used, luminous intensities were reduced by 10.8% and 15.1% in comparison with the maximum luminous intensity of the phosphor powder. From the above results, it can be seen that the phosphor paste composition including the dispersant of the present invention has improved luminous intensity in comparison with a conventional phosphor paste composition.

The novel dispersant of the present invention is advantageous in that, when it is included in a phosphor paste composition, it improves the dispersibility of the phosphor and undesirable oxidation by an organic solvent can be avoided. Particularly, the dispersant of the present invention can show better effects when it is added to a sulfide phosphor paste composition.

In the phosphor paste composition including the dispersant of the present invention, since dispersibility is improved and a viscosity increment is reduced, additional phosphors can be used, thus it is possible to provide a more uniform phosphor film having improved luminescent properties. Therefore, in the present invention, it is possible to produce a display, such as an LCD, which has high brightness and excellent processability.

The terms "a", "an" and "the" not denote a limitation of quantity, but rather denote the presence of at least one of the referenced item.

The modifier "about" used in connection with a quantity is inclusive of the stated value and has the meaning dictated by the context (e.g., includes the degree of error associated with measurement of the particular quantity and/or allows for variations among various embodiments that share a stated characteristic).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sulfide phosphor paste composition comprising:
   40-70 wt % of a phosphor;
   0.1-3 wt % of a carboxylic ester dispersant of Formula 1 based on the phosphor, and
   a balance of a binder solution including a solvent having an evaporation temperature of 150° C. or higher and an organic binder;

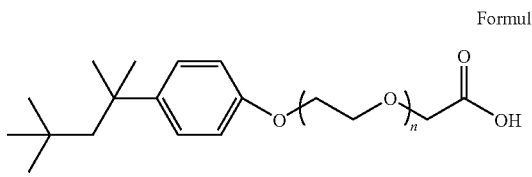

Formula 1 wherein n is 1-20.

2. The sulfide phosphor paste composition as set forth in claim 1, wherein the binder solution comprises 1.5-5 wt % of organic binder and a balance of mixed solvent.

3. The sulfide phosphor paste composition as set forth in claim 1, wherein the organic binder is selected from a group consisting of acryls, styrenes, celluloses, a methacrylic acid ester polymer, a styrene-acrylic ester copolymer, polystyrene, polyvinyl butyral, polyvinyl alcohol, polyethylene oxide, polypropylene carbonate, and polymethylmethacrylate.

4. The sulfide phosphor paste composition as set forth in claim 1, wherein the solvent is one or more selected from a group consisting of an aromatic hydrocarbon compound including toluene and xylene, an ether compound including tetrahydrofuran and 1,2-butoxy ethane, a ketone compound including acetone and methyl ethyl ketone, an ester compound including ethyl acetate, butyl acetate, and butyl carbitol acetate (BCA), and an alcohol compound including isopropyl alcohol, diethylene glycol monobutyl ether, terpineol, and 2-phenoxyethanol.

5. The sulfide phosphor paste composition as set forth in claim 1, wherein the organic binder is ethyl cellulose and the solvent is a mixed solvent of terpineol and butyl carbitol acetate.

6. The sulfide phosphor paste composition as set forth in claim 5, wherein the mixed solvent includes terpineol and butyl carbitol acetate mixed with each other in a weight ratio of 1:1-1:2.5.

7. The sulfide phosphor paste composition as set forth in claim 1, wherein the phosphor is selected from a group consisting of $SrS:Eu^{2+}$, $SrGaS:Eu^{2+}$, $SrCaS:Eu^{2+}$, $ZnS:Ag^+$, $CaS:Eu^{2+}$, $ZnS:Cu^+Al^{3+}$, $ZnS:Ag^+,Cl^-$, $La_2O_2S:Eu^{3+}$, $Y_2O_2S:Eu^{3+}$, $CaAl_2S_4$, and $BaAl_2S_4:Eu^{2+}$.

8. A phosphor film for a display produced using the phosphor paste composition according to claim 1.

9. A display comprising the phosphor film of claim 8.

10. The display as set forth in claim 9, wherein the display is a cathodoluminescent display, a liquid crystal display, an electroluminescent display, a field emission display, or a vacuum fluorescent display.

11. The sulfide phosphor paste composition as set forth in claim 4, wherein the solvent is one or more selected from the group consisting of toluene, xylene, tetrahydrofuran, 1,2-butoxy ethane, acetone, methyl ethyl ketone, ethylacetate, butyl acetate, butyl carbitol acetate (BCA), isopropyl alcohol, diethylene glycol monobutyl ether, terpineol, and 2-phenoxyethanol.

* * * * *